3,389,187
PERFLUOROISOBUTYLENE DIMER
Donald L. Miller, Midland, Mich., assignor to The Dow Chemical Company, Midland, Mich., a corporation of Delaware
No Drawing. Filed Apr. 27, 1964, Ser. No. 362,956
4 Claims. (Cl. 260—653.1)

ABSTRACT OF THE DISCLOSURE

A process for preparing perfluoro-2,4,4-trimethyl-2-pentene, which comprises reacting perfluoroisobutylene in an inert solvent at a maximum temperature of about 0° C. in the presence of cesium fluoride or rubidium fluoride catalyst. By following the controlled reaction conditions using the disclosed reactants, perfluoro-2,4,4-trimethyl - 2 - pentene, substantially free from other dimers, trimers or polymers, is obtained in high yield.

---

This invention relates to perfluorocarbons and more particularly is concerned with a novel dimer of perfluoroisobutylene and a method of its preparation.

The present novel compound is perfluoro-2,4,4-trimethyl-2-pentene, i.e., 1,1,1,3,5,5,5-heptafluoro - 2,4,4 - tris(trifluoromethyl)-2-pentene and corresponds to the formula

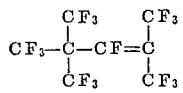

This compound has a density of 1.7849 at 25° C., a refractive index, $n_D^{20}$ of about 1.28 and a boiling point of 91.5° C. at atmospheric pressure (~750 mm. mercury). It is a colorless liquid which can be distilled without decomposition.

In general it is prepared by reacting perfluoroisobutylene in an inert solvent at a maximum temperature of about 0° C. in the presence of cesium fluoride or rubidium fluoride catalyst.

In a preferred method of preparation, perfluoroisobutylene is condensed into substantially anhydrous diethyl ether containing cesium fluoride catalyst. The reaction mass is sealed off from exterior atmosphere and maintained at a temperature of from about minus 20 to about minus 50° C. or lower for a period of from about 5 to about 24 hours. Ether solvent and any excess unreacted perfluoroisobutylene are removed after the reaction period, ordinarily by distillation below room temperature at a reduced pressure, and the product dimer recovered. Conveniently the product can be simultaneously recovered and purified by direct distillation from the reaction vessel.

The relative amounts of inert solvent to perfluoroisobutylene reactant are not critical. At a minimum the amount of solvent should be that which will completely dissolve the perfluoroisobutylene. Maximum quantities of solvent generally are selected so as not to produce unwieldy large, hard to handle quantities of liquids. Usually the solvent-perfluoroisobutylene volume ratio ranges from about 0.5 to about 5 and preferably from about 1 to 2.

The amount of catalyst to be used at a minimum is that which will provide the necessary activation of the perfluoroisobutylene reactant to produce the dimer product. Excessively large amounts of catalyst are neither desired nor required although these do not detrimentally alter the course of the reaction. Usually from about 1 to about 25 mole percent of catalyst based on the prefluoroisobutylene reactant are employed.

Solvents suitable for use in the instant process are those inert liquid organics which do not react with the perfluoroisobutylene reactant or the dimer product. Generally ethers such as alkyl ethers (diethyl ether, diisopropyl ether, etc.) tetrahydrofuran and the like are employed.

The cesium fluoride or rubidium fluoride catalyst usually is employed as a finely divided particulate material. This need not be of ultra high purity and chemically pure grade materials have been found to be satisfactory.

All reactants are to be substantially anhydrous in order to achieve the optimum in product yield.

It is an unexpected advantage of the present novel process that, uniquely, principally the single novel dimer product of the present invention is produced in high yield. Known art processes for preparing unsaturated perfluorocarbons usually and expectedly provide, at a minimum a mixture of several compounds. See for example U.S. Patent 2,918,501 by Brehm et al.

The present novel product is suitable for use as a solvent as well as can be used as an intermediate in the preparation of other useful compounds through attack on the double bond. The following example will serve to further illustrate the present invention but it is not meant to limit it thereto.

EXAMPLE

About 2 milliliters of substantially anhydrous diethyl ether and about 30 milligrams (~0.002 gram mole) of finely divided chemically pure substantially anhydrous cesium fluoride were placed in a 25 cubic centimeter glass reaction vessel. The vessel and contents were cooled to about minus 190° C. and then attached to a low pressure line and degassed at an absolute pressure of about 0.001 millimeter mercury absolute. About 0.015 gram mole of perfluoroisobutylene (density about 1.6 grams/cubic centimeter in condensed form) was condensed into the reactor at this temperature. This provided a reaction mass wherein the amount of catalyst was about 13 mole percent based on perfluoroisobutylene. The solvent/perfluoroisobutylene volume ratio was about one. The vessel was then sealed. The reaction mixture was warmed to about minus 30° C. and kept at this temperature for about 16 hours while being continually agitated. After the reaction period, the reactor again was cooled to about minus 190° C., opened and attached to the low pressure line. Volatile gases were pumped from the reaction mass and the mixture allowed to warm to about minus 10° C. whereupon ether and unreacted perfluoroisobutylene were distilled from the product mass. The reaction product mass was warmed to room temperature (about 20° C.) and distilled. Product yield based on recovery of the novel perfluoroisobutylene dimer of the present invention and the unreacted perfluoroisobutylene reactant indicated a product yield of about 90 percent.

Substantially all of the product mass distilled at 91.5° C. at atmospheric pressure (about 750 millimeters mercury) as a colorless liquid. This product had a density at 25° C. of 1.7849 grams per centimeter. The refractive index, $n_D^{20}$ was about 1.28.

Elemental analysis for fluorine showed 75.8 percent; carbon content was 25.3 percent. The molecular weight was found to be 402. Theoretical calculated analysis for perfluoro - 2,4,4 - trimethyl - 2 - pentene compound is fluorine—76% and carbon—24%. The theoretical molecular weight is 400.

Nuclear magnetic residence data confirmed the structural formula for the dimer in that no $CF_2$ groups were present and the ratio of the types of fluorine was 9:6:1.

Infrared spectroscopy showed characteristic absorption as a sharp spike at 6.02 microns and a broad band at from 7.5 to 8.6 microns.

In a manner similar to that described for the foregoing example, the present novel perfluoro-2,4,4-trimethyl-2-pentene compound can be prepared by undergoing self-addition in the presence of rubidium fluoride catalyst and diisopropyl ether at a temperature of about 0° C. using a solvent to perfluoroisobutylene volume ratio of about 0.5 and about 25 molar percent of catalyst based on perfluoroisobutylene reactant.

Similarly the product can be prepared from a diethyl ether solution at a solvent to perfluoroisobutylene ratio of 5 using about 1 mole percent cesium fluoride catalyst at a temperature of about minus 50° C.

Various modifications can be made in the present invention without departing from the spirit or scope thereof for it is understood that I limit myself only as defined in the appended claims.

I claim:

1. A process for preparing perfluoro-2,4,4-trimethyl-2-pentene which comprises:
   (a) reacting perfluoroisobutylene in an inert solvent at a maximum temperature of about 0° C. in the presence of a catalyst selected from the group consisting of cesium fluoride and rubidium fluoride, the amount of catalyst ranging from about 1 to about 25 mole percent based on the perfluoroisobutylene reactant,
   (b) maintaining the reaction mixture at this temperature for a period of from about 5 to about 24 hours, and
   (c) recovering said perfluoro-2,4,4-trimethyl-2-pentene from the reaction mixture.

2. A process for preparing perfluoro-2,4,4-trimethyl-2-pentene which comprises:
   (a) condensing perfluoroisobutylene into substantially anhydrous diethyl ether containing a catalyst selected from the group consisting of cesium fluoride and rubidium fluoride, the diethyl ether solvent to perfluoroisobutylene volume ratio ranging from about 0.5 to about 5 and the amount of catalyst being from about 1 to about 25 mole percent based on the perfluoroisobutylene reactant,
   (b) reacting said perfluoroisobutylene at a temperature of from about minus 20 to about minus 50° C. for a period of from about 5 to about 24 hours, and
   (c) removing said diethyl ether solvent and any unreacted perfluoroisobutylene from the resulting product mass and recovering said perfluoro-2,4,4-trimethyl-2-pentene.

3. The process as defined in claim 2 and including the step of recovering and purifying said product by directly distilling it from the reaction vessel subsequent to the removal of ether solvent and excess unreacted perfluoroisobutylene therefrom.

4. A process for preparing perfluoro-2,4,4-trimethyl-2-pentene which comprises:
   (a) condensing at a temperature of about minus 190° C. perfluoroisobutylene into a reaction vessel containing substantially anhydrous diethyl ether and substantially anhydrous cesium fluoride, the amount of catalyst being about 13 mole percent based on the perfluoroisobutylene and the diethyl ether solvent/perfluoroisobutylene volume ratio being about 1.
   (b) warming the reaction mixture to about minus 30° C. and maintaining the reaction mass at this temperature for about 16 hours under continuous agitation,
   (c) cooling the reaction mass to about minus 190° C. and removing volatile gases therefrom,
   (d) warming the reaction mass to about minus 10° C. and distilling said diethyl ether and unreacted perfluoroisobutylene therefrom, and
   (e) distilling said perfluoro-2,4,4-trimethyl-2-pentene from the reaction vessel.

References Cited

UNITED STATES PATENTS

| | | | |
|---|---|---|---|
| 2,918,501 | 12/1959 | Brehm et al. | 260—653.3 |
| 3,244,684 | 4/1966 | Teumac et al. | 260—653.1 |

OTHER REFERENCES

Olah, Friedel-Crafts and Related Reactions, vol. 2, part 2, pages 1296–1297 (1964), Interscience Publishers, New York, N.Y.

DANIEL D. HORWITZ, *Primary Examiner.*